United States Patent
Fuller et al.

(10) Patent No.: US 8,861,162 B2
(45) Date of Patent: Oct. 14, 2014

(54) HIGH POWER SOLID STATE POWER CONTROLLER (SSPC) SOLUTION FOR PRIMARY POWER DISTRIBUTION APPLICATIONS

(75) Inventors: Randy Fuller, Hillsburgh (CA); Zhenning Liu, Missisauga (CA)

(73) Assignee: Honeywell International Inc., Morristown, NJ (US)

( * ) Notice: Subject to any disclaimer, the term of this patent is extended or adjusted under 35 U.S.C. 154(b) by 537 days.

(21) Appl. No.: 12/720,187

(22) Filed: Mar. 9, 2010

(65) Prior Publication Data

US 2011/0222200 A1 Sep. 15, 2011

(51) Int. Cl.
*H02H 3/08* (2006.01)
*H02H 9/02* (2006.01)
*H01H 9/54* (2006.01)
*H02H 3/00* (2006.01)
*H02H 9/08* (2006.01)
*H02H 3/087* (2006.01)
*H02J 4/00* (2006.01)

(52) U.S. Cl.
CPC .............. *H01H 9/548* (2013.01); *H02H 3/087* (2013.01); *H02J 4/00* (2013.01)
USPC ........................................ 361/93.1; 361/42

(58) Field of Classification Search
USPC ................................................. 361/93.1, 42
See application file for complete search history.

(56) References Cited

U.S. PATENT DOCUMENTS

| 4,009,420 A | 2/1977 | Martinez-dePison |
| 7,020,790 B2 | 3/2006 | Mares |
| 7,538,454 B2 | 5/2009 | Yu et al. |
| 7,612,972 B2 * | 11/2009 | Battani et al. .................... 361/42 |
| 7,656,634 B2 | 2/2010 | Robertson et al. |
| 2003/0155892 A1 * | 8/2003 | Poletti ........................... 320/137 |
| 2010/0320971 A1 * | 12/2010 | Zhu et al. ....................... 320/134 |
| 2011/0309809 A1 * | 12/2011 | Rao et al. ....................... 323/282 |

* cited by examiner

*Primary Examiner* — Jared Fureman
*Assistant Examiner* — Lucy Thomas
(74) *Attorney, Agent, or Firm* — Shimokaji & Assoc. P.C.

(57) ABSTRACT

High-power power distribution in an aircraft may use solid state power controller (SSPC) technology. A conventional electromechanical contactor may be used, in series, with a solid state switching device (SSSD) to achieve high-power power distribution. Since the electromechanical contactor does not need to be rated for arc handlings during normal SSPC operation, the electromechanical contactor may be simplified, resulting in cost, weight, volume, and failure rate reductions. The power distribution apparatus and methods of the present invention may be applicable for both alternating current (AC) and direct current (DC) applications and can be modified to form a three phase SSPC.

5 Claims, 4 Drawing Sheets

US 8,861,162 B2

HIGH POWER SOLID STATE POWER CONTROLLER (SSPC) SOLUTION FOR PRIMARY POWER DISTRIBUTION APPLICATIONS

BACKGROUND OF THE INVENTION

The present invention relates to apparatus and methods for primary power distribution and, more particularly, to apparatus and methods for high-power power distribution using solid state power controller (SSPC) technology.

In existing aircraft primary power distribution systems, electromechanical relays/contactors, along with circuit breakers, are exclusively used for load, feeder, bus tie and power source controls. These electromechanical contactors are generally large, heavy and expensive, and have a limited contact cycle life due to arcing, wear, and metal degradation.

SSPC technology is gaining acceptance as a modern alternative to electromechanical contactors due to its high reliability, "soft" switching characteristics, fast response time, and ability to facilitate advanced load management and other aircraft functions. A typical SSPC mainly comprises a solid state switching device (SSSD), which performs the fundamental power on/off switching, and a SSPC processing engine, which is responsible for SSSD on/off control and feeder wire protection. While SSPCs with current rating less than 15A have been widely used in aircraft secondary distribution systems, their applications in aircraft primary distribution systems still face strong technical challenges.

Other than excessive power dissipation, voltage drop, and leakage current associated with SSPCs with high power ratings using existing SSSDs, predominantly metal-oxide-semiconductor field-effect transistors (MOSFETs) or MOSFETs in combination with insulated gate bipolar transistor (IGBTs), the "fail shorted" nature of SSSD also becomes a critical concern for the certification of the SSPC technology for commercial aircrafts.

In order to meet the safety and reliability requirements enforced by the certification authorities, a secondary protection mechanism, typically a fuse, has to be included in series with the SSPC. Such a protection mechanism is often sized to provide the same level of wire protection, in terms of the energy rating, which could easily interact with SSPC's trip mechanism. In addition, leakage current through off SSSDs may pose a safety issue when performing maintenance on downstream loads. Conventional solutions introduce an SSPC output clamping circuitry.

In AC applications, the basic SSSD configuration is usually formed by two MOSFETs (or other field effect transistors (FETs)) connected "back to back" to facilitate the symmetrical bi-directional power switch functions. Any one of such FET devices failing shorted when the SSPC is in the off state will result in a rectified DC power supplied to its controlling load or multiple loads, causing unexpected load behavior or potential damage, which cannot be effectively resolved by use of a fuse in series.

Various efforts have been made in search of alternative semiconductors for use in the high power SSSD to reduce the power dissipation. GaN based high electron mobility transistors (HEMTs) (e.g. GaNpowIR) and SiC based vertical-junction FETs (VJFETs) are considered two most promising candidates in terms of both the economic viability and their superior performance over the conventional Si based SSSDs. However, their "normally on" characteristics prevent them from being directly applied to power distribution system, due to safety concerns.

As can be seen, there is a need to provide a practical, certifiable solution for the SSPC to be used in aircraft primary power distribution systems. There is also a need to provide such a solution, which may result in reduced power dissipation, improved reliability and fault current handling capability, and smaller component volume.

SUMMARY OF THE INVENTION

In one aspect of the present invention, a solid state power controller (SSPC) comprises a solid state switching device (SSSD) receiving power from a main power bus; a contactor electrically connected in series to the SSSD, wherein an output from the contactor provides a power output of the SSPC.

In another aspect of the present invention, a primary power distribution system for an aircraft comprises a solid state power controller (SSPC) for interrupting power in a main power bus, the SSPC including a solid state switching device (SSSD) receiving power from a main power bus, an electromechanical contactor electrically connected in series to the SSSD, wherein an output from the contactor provides a power output of the SSPC; and a command interface within the SSPC for receiving commands for power control through the SSPC.

In a further aspect of the present invention, a method for controlling primary power distribution along a main power bus comprises powering up a solid state power controller (SSPC) by opening a contactor and turning off a solid state switching device (SSSD), wherein the SSSD receives power from the main power bus and the contactor outputs power from the SSPC; turning on the SSPC by sequentially closing the contactor and turning on the SSSD; and commanding the SSPC off upon a SSPC trip or an overcurrent fault.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features.

Broadly, exemplary embodiments of the present invention provide apparatus and methods for high-power power distribution using solid state power controller SSPC technology. A conventional electromechanical contactor may be used, in series, with a SSSD to achieve high-power distribution. Since the electromechanical contactor does not need to be rated for arc handlings during normal SSPC operation, the electromechanical contactor may be simplified for cost, weight and volume reductions. The power distribution apparatus and methods of the present invention may be applicable for both alternating current (AC) and direct current (DC) applications and can be modified to form a three phase SSPC.

The electromechanical contactor may be opened to achieve galvanic isolation when the SSPC is off, so that leakage current associated with the SSSD can be avoided. Furthermore, if the SSSD fails shorted, the electromechanical contactor may serve as a secondary means of fault isolation, thereby aiding in the certification of the SSPC solution according to embodiments of the present invention.

Figure 1:
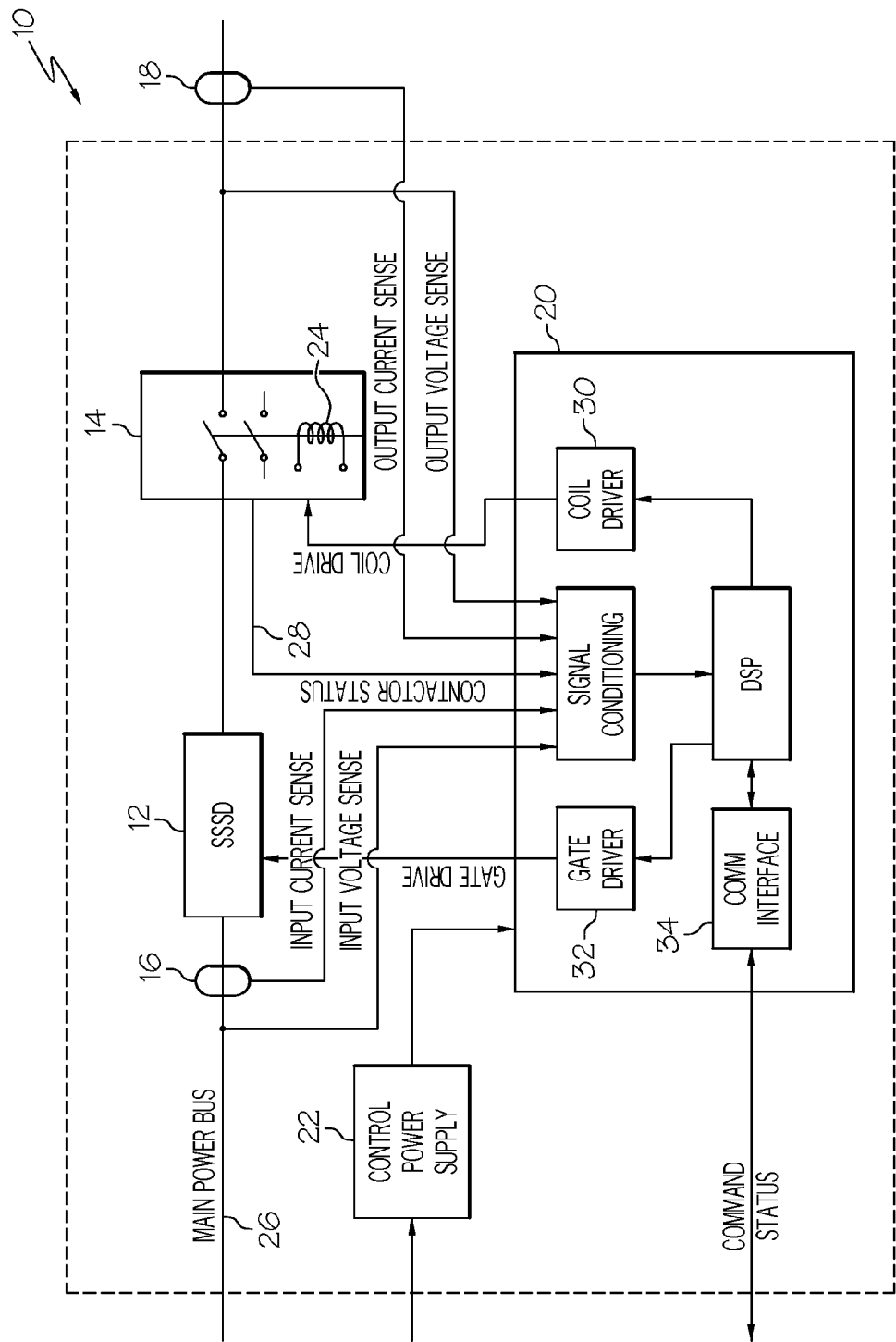
FIG. 1 is a functional block diagram of a high power SSPC for primary power distribution, according to an embodiment of the present invention.

Referring to FIG. 1, the SSPC 10 may include a SSSD 12 for power switching along a main bus 26, for example a main power bus that carries power between about 25 to about 300 amperes, an electromechanical contactor 14 electronically connected to and located electronically downstream from the SSSD 12, an input power bus current sensor 16, an output power bus current sensor 18, a DSP based SSPC control engine 20, and a control power supply 22, providing necessary control power for the DSP based SSPC control engine 20, the SSSD 12, and contactor coil drives 24.

An input power bus current sensor 16 and an output bus current sensor 18 may be used to facilitate SSPC functions and differential current sensing required for primary bus power controls and management.

The SSSD 12 responsible for the main bus power switching can be formed by either conventional Si based MOSFETs, or MOSFETs in combination with IGBTs for relatively low power rating applications (e.g. for feeder line control), or by the emerging new SiC based MOSFETs or "normally on" semiconductor devices, such as GaNpowIR and SiC based VJFET, for high power applications (e.g. for main power source and bus tie controls).

The introduction of the electromechanical contactor 14 may allow the use of "normally on" semiconductor devices, such as the GaN based HEMT and SiC based VJFET, as the main power switching device for the SSPC 10, through coordinated control between the SSSD and the contactor, which may eliminate the safety concerns during initial application of power to the SSPC 10 and SSPC loss of control power. By commanding the contactor 14 in the open state, galvanic isolation of the SSSD 12 can be achieved when the SSPC 10 is at the "off state", so that the leakage current issue associated with the SSSD can be resolved. The contactor 14 can serve as a secondary means of fault isolation when the SSSD 12 fails short, making embodiments of the present invention suitable for primary distribution applications. The contactor 14 may also enable the SSSD 12 to be a uni-directional SSSD based power switch for certain bi-directional applications, as the reverse blocking capability of the SSSD 12 can be achieved through opening of the electromechanical contactor 14. The significance of this capability can be self evident when comparing the differences in terms of the resulting SSSD on-resistance (i.e. the power dissipation, and therefore the associated thermal management means which impact the cost, weight, and reliability of the SSPC 10) using the same number of MOSFETs, between a uni-directional SSSD and a bidirectional one. Four MOSFETs may be required for a bi-directional switch to achieve the same level of on-resistance of a single MOSFET based single directional switch (a 4:1 ratio).

During normal operation, the contactor 14 may only be intended to provide low contact resistance and may remain in the "closed state" as long as the SSPC 10 is in the "on state", and to provide galvanic isolation by staying in the "open state" when the SSPC 10 is in the "off state". Since there is no current (except the leakage current, which is typically on the milliamp scale or less) break-up involved during normal contactor open/close transitions as a result of coordinated control between the SSSD 12 and the contactor 14, the contactor 14 can thus be selected to be a relatively simple device which may not need to handle arcs. The contactor 14 may only be required to be capable of successfully breaking up a predetermined fault current as an infrequent occurrence, such as a couple of times over its lifecycle, in case the SSSD 12 fails "shorted". An auxiliary contact output 28 associated with the contactor 14 can be used by the SSPC control engine 20 to determine the open/close status of the contactor 14. Alternatively, the open/close status of the contactor 14 can also be derived from the input/output current/voltage sensing signals 16, 18, which further simplifies the structure of the contactor 14.

The DSP based SSPC control engine 20 may be responsible for the entire operation of the SSPC 10, including the power commutation (turning power on/off), over current and differential current protection, receiving command and SSPC status reporting through communication network interfaces, coordinated control between the SSSD 12 and the electromechanical contactor 14, contactor coil 24 power minimization, and SSPC's diagnostic/prognostic health management (DPHM).

It should be understood that above described SSPC hardware configuration is applicable for both AC and DC applications, and it can be easily extended to a form for a three phase AC applications.

Figure 2:
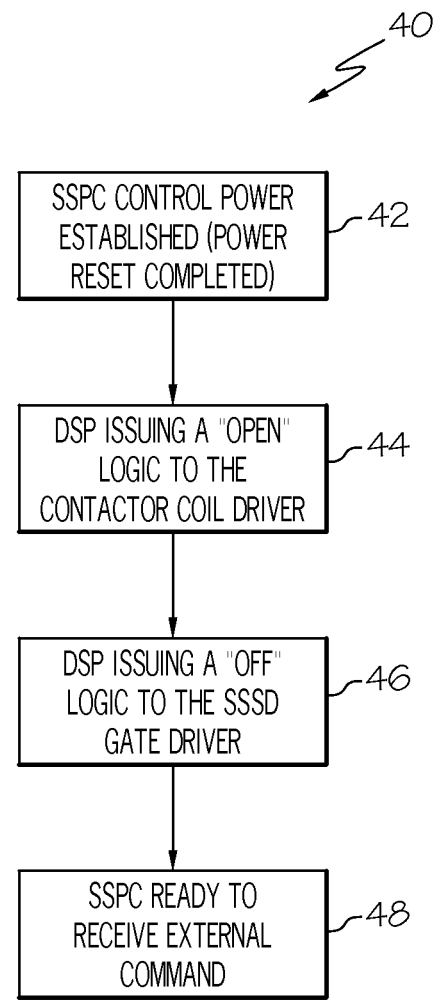
FIG. 2 is a flow chart generally following the process for initial power-up of the SSPC of FIG. 1, according to an embodiment of the present invention.
Figure 3:
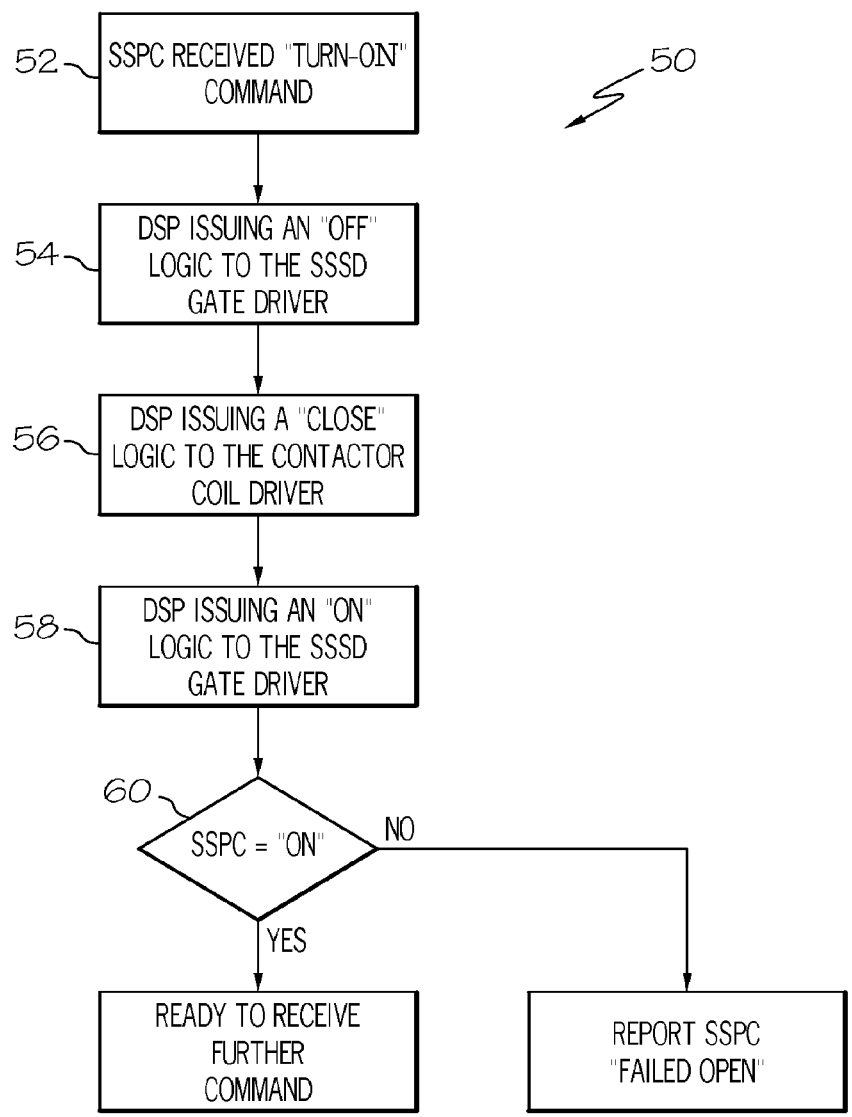
FIG. 3 is a flow chart generally following the process by which the SSPC of FIG. 1 is commended on, according to an embodiment of the present invention.
Figure 4:
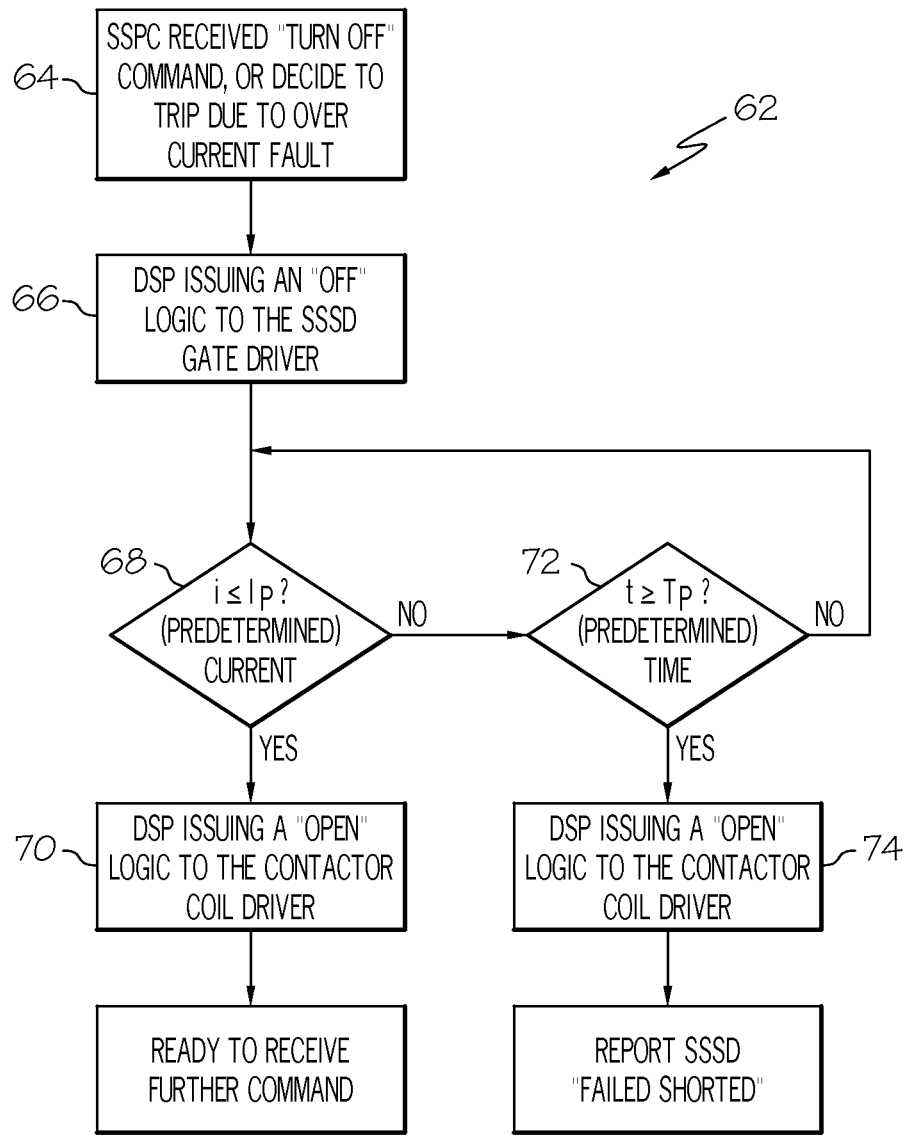
FIG. 4 is a flow chart generally following the process by which the SSPC of FIG. 1 is commanded off, or trips on an overcurrent fault, according to an embodiment of the present invention.

FIGS. 2 through 4 help illustrate various control methods for the SSSD 12 and the electromechanical contactor 14.

Referring specifically to FIG. 2, a process 40 provides initial power-up of the SSPC 10 of FIG. 1 according to an embodiment of the present invention. In an initial step 42, SSPC control power may be established. This may be established by a completed power reset, for example. The SSPC control engine 20 may issue an "open" logic to a contactor control driver 30 in step 44. In step 46, the SSPC control engine 20 may issue an "off" logic to a SSSD gate driver 32. At this stage 48, the SSPC 10 may be ready to receive external commands via a command interface 34.

Referring now to FIG. 3, the SSPC 10 of FIG. 1 is commended "on" by a process 50 according to an embodiment of the present invention. In an initial step 52, the SSPC 10 may receive a "turn on" command. After receiving this command, a step 54 may result in the SSPC control engine 20 issuing an "off" logic to the SSSD gate driver 32, thereby assuring the SSSD 12 if off. The SSPC control engine 20 may issue a "close" logic to the contactor coil driver 30, causing the contactor 14 to close in a step 56. The SSPC control engine 20 may then issue an "on" logic to the SSSD gate driver 32, thereby turning on the SSSD 12 and permitting power flow through the SSPC 10 at step 58. A decision point 60 may check to see if the SSPC 10 is on. If the result of the decision point 60 is yes, the SSPC control engine 20 may be ready to receive further commands. If the result of the decision point 60 is no, then the process 50 may report the SSPC 10 as failed open.

Referring to FIG. 4, in a process 62 the SSPC 10 of FIG. 1 is commanded off, or trips on an overcurrent fault, according to an embodiment of the present invention. At an initial step 64, the SSPC 10 may receive a turn-off command or may decide to trip due to an overcurrent fault. After this step 64, the SSPC control engine 20 may issue an "off" logic to the SSSD gate driver 32, thereby turning off the SSSD 12 at step 66. At a decision point 68, the current through the SSPC 10 may be measured. If the current is less than or equal to a predetermined current ($I \leq I_P$), then the SSPC control logic 20 may issue an "open" logic to the contactor coil driver 30, thereby opening the contactor 14 at step 70. At this point, the SSPC control logic 20 may be ready to receive further commands. However, at decision point 68, if the current is greater than the predetermined current, then the process 62 moves to decision point 72, where the current time spent in process 62 (T) may be compared to a predetermined time ($T_P$). If $T \geq T_P$, then the SSPC control logic 20 may issue an "open" logic to the contactor coil driver 30, thereby opening the contactor 14 at step 74. At this point, the SSPC control logic 20 may be ready to receive further commands. However, if $T < T_P$, then the SSPC control logic 20 may loop back to decision point 68.

The above mentioned control processes 40, 50, 62 may make sure that the SSPC 10 may act as a "normally off" switch, the electromechanical contactor 14 may not break any significant current during normal SSPC operations, and the contactor 14 may serve as a secondary mean for overcurrent fault isolation. The rest of control processes should be no different than any other conventional SSPCs.

The hardware configuration of the high power SSPC 10, suitable for aircraft primary electric power distribution applications, may achieve reduced power dissipation, improved reliability and fault current handling capability, simplified component structure, and easy certifiability. Embodiments of the present invention may introduce a simple and under rated conventional electromechanical contactor (such as contactor 14) in series with a SSSD (such as SSSD 12), to achieve following benefits: a) By commanding the contactor in the open state, galvanic isolation can be achieved when the SSPC is at the "off state", so that the leakage current issue associated with the SSSD can be resolved; b) The contactor can serve as a secondary mean of fault isolation when the SSSD fails "shorted", making the SSPC of the present invention certifiable for primary distribution applications; and c) Embodiments of the present invention may allow the use of "normally on" semiconductor devices, such as the GaNpowIR and SiC based VJFET, as the main power switching device for the SSPC, through coordinated control between the SSSD and the contactor, which may eliminate the safety concerns during SSPC power up/down. Since the electromechanical contactor does not need to be rated for arc handlings during normal SSPC operation, its design can thus be simplified for cost and volume reductions. Embodiments of the present invention may be applicable for both AC and DC applications, and can be easily modified to form a three phase SSPC.

It should be understood, of course, that the foregoing relates to exemplary embodiments of the invention and that modifications may be made without departing from the spirit and scope of the invention as set forth in the following claims.

We claim:
1. A solid state power controller (SSPC) comprising:
a solid state switching device (SSSD) configured to receive power from a main power bus;
an electromechanical contactor electrically connected in series to the SSSD,
wherein an output from the contactor is configured to provide a power output of the SSPC;
an input power current sensor to measure current along the main power bus before the SSSD;
an output power current sensor to measure current at the output side of the contactor; and
a digital signal processor (DSP) based SSPC control engine configured to:
turn off the SSSD in response to the SSPC being in an "off" state and,
open the contactor in response to the SSPC being in the "off" state as determined based on the measured current from the input power current sensor, the measured current from the output power current sensor, and a contactor status received from the electromechanical contactor.

2. The SSPC of claim 1, further comprising an auxiliary contact output to determine whether the contactor is open or closed.

3. The SSPC of claim 1, further comprising a self contained control power supply for providing power to the SSPC control engine.

4. The SSPC of claim 1, wherein the SSPC control engine includes a contactor coil driver operative for opening and closing the contactor, and a gate driver operative for turning on and off the SSSD.

5. A primary power distribution system for an aircraft, the system comprising:
a solid state power controller (SSPC) operative to interrupt power in a main power bus, the SSPC including:
a solid state switching device (SSSD) receiving power from a main power bus,
an electromechanical contactor electrically connected in series to the SSSD and having an output, wherein the SSPC is configured to supply power via the output;
an input power current sensor to measure current along the main power bus before current is fed to the SSSD;
an output power current sensor to measure current at the output of the electromechanical contactor; and
a digital signal processor (DSP) based SSPC control engine configured to turn off the SSSD and open the electromechanical contactor:
in response to the SSPC being in an "off" state, and
based on the measured current from the input power current sensor, the measured current from the output power current sensor, and a measured voltage of the main power bus; and
a command interface to receive commands for power control through the SSPC.

* * * * *